(12) United States Patent
Lang et al.

(10) Patent No.: US 8,263,921 B2
(45) Date of Patent: Sep. 11, 2012

(54) PROCESSING METHODS FOR SPECKLE-BASED MOTION SENSING

(75) Inventors: Robert J. Lang, Alamo, CA (US);
Brian Todoroff, San Jose, CA (US);
Yansun Xu, Mt. View, CA (US); Jeffry C. Bailey, Newark, CA (US)

(73) Assignee: Cypress Semiconductor Corporation, San Jose, CA (US)

( * ) Notice: Subject to any disclaimer, the term of this patent is extended or adjusted under 35 U.S.C. 154(b) by 1194 days.

(21) Appl. No.: 11/890,651

(22) Filed: Aug. 6, 2007

(65) Prior Publication Data

US 2009/0040062 A1    Feb. 12, 2009

(51) Int. Cl.
*G06F 3/033* (2006.01)
*G09G 5/08* (2006.01)

(52) U.S. Cl. .................. 250/206.2; 250/221; 345/166; 702/189

(58) Field of Classification Search ............... 250/206.2, 250/221; 345/166; 702/66, 189, 198, 199; 708/445
See application file for complete search history.

(56) References Cited

U.S. PATENT DOCUMENTS

| | | | |
|---|---|---|---|
| 3,922,093 A | 11/1975 | Dandliker et al. |
| 4,546,347 A | 10/1985 | Kirsch |
| 4,799,055 A | 1/1989 | Nestler et al. |
| 4,936,683 A | 6/1990 | Purcell |
| 5,288,993 A | 2/1994 | Bidiville et al. |
| 5,345,527 A | 9/1994 | Lebby et al. |
| 5,473,344 A | 12/1995 | Bacon et al. |
| 5,578,813 A | 11/1996 | Allen et al. |
| 5,606,174 A | 2/1997 | Yoshimura et al. |
| 5,644,139 A | 7/1997 | Allen et al. |
| D382,550 S | 8/1997 | Kaneko et al. |
| D385,542 S | 10/1997 | Kaneko et al. |
| 5,703,356 A | 12/1997 | Bidiville et al. |
| 5,729,008 A | 3/1998 | Blalock et al. |
| 5,729,009 A | 3/1998 | Dandliker et al. |
| 5,781,229 A | 7/1998 | Zediker et al. |
| 5,786,804 A | 7/1998 | Gordon |
| 5,825,044 A | 10/1998 | Allen et al. |
| 5,854,482 A | 12/1998 | Bidiville et al. |
| 5,907,152 A | 5/1999 | Dandliker et al. |
| 5,963,197 A | 10/1999 | Bacon et al. |
| 5,994,710 A | 11/1999 | Knee et al. |
| 6,031,218 A | 2/2000 | Piot et al. |
| 6,037,643 A | 3/2000 | Knee |
| 6,057,540 A | 5/2000 | Gordon et al. |
| 6,097,371 A | 8/2000 | Siddiqui et al. |
| 6,151,015 A | 11/2000 | Badyal et al. |
| 6,172,354 B1 | 1/2001 | Adan et al. |

(Continued)

OTHER PUBLICATIONS

International Search Report for Application No. PCT/US2008/009397 dated Dec. 3, 2008; 3 pages.

(Continued)

*Primary Examiner* — John Lee

(57) ABSTRACT

One embodiment relates to a method of tracking motion using a speckle-based motion sensor. A distance moved is determined by a first signal processing procedure, and a distance moved is determined by a second signal processing procedure. Selection between said distances is made based on whether the distance determined by the first signal processing procedure exceeds a predetermined threshold distance. According to a preferred embodiment, the first signal processing procedure makes a more accurate determination of distance for slower speeds, while the second signal processing procedure makes a more accurate determination of distance for higher speeds. Other embodiments, aspects and features are also disclosed.

20 Claims, 16 Drawing Sheets

U.S. PATENT DOCUMENTS

| | | |
|---|---|---|
| 6,225,617 B1 | 5/2001 | Dandliker et al. |
| 6,233,368 B1 | 5/2001 | Badyal et al. |
| 6,256,016 B1 | 7/2001 | Piot et al. |
| 6,281,881 B1 | 8/2001 | Siddiqui et al. |
| 6,281,882 B1 | 8/2001 | Gordon et al. |
| 6,326,950 B1 | 12/2001 | Liu |
| 6,330,057 B1 | 12/2001 | Lederer et al. |
| 6,351,257 B1 | 2/2002 | Liu |
| 6,396,479 B2 | 5/2002 | Gordon |
| 6,421,045 B1 | 7/2002 | Venkat et al. |
| 6,422,595 B1 * | 7/2002 | Breed et al. ............. 280/735 |
| 6,424,407 B1 | 7/2002 | Kinrot et al. |
| 6,433,780 B1 | 8/2002 | Gordon et al. |
| 6,452,683 B1 | 9/2002 | Kinrot et al. |
| 6,455,840 B1 | 9/2002 | Oliver et al. |
| D464,352 S | 10/2002 | Kerestegian |
| 6,462,330 B1 | 10/2002 | Venkat et al. |
| 6,476,970 B1 | 11/2002 | Smith |
| 6,529,184 B1 | 3/2003 | Julienne |
| 6,585,158 B2 | 7/2003 | Norskog |
| 6,603,111 B2 | 8/2003 | Dietz et al. |
| 6,618,038 B1 | 9/2003 | Bohn |
| 6,621,483 B2 | 9/2003 | Wallace et al. |
| 6,642,506 B1 | 11/2003 | Nahum et al. |
| 6,657,184 B2 | 12/2003 | Anderson et al. |
| 6,664,948 B2 | 12/2003 | Crane et al. |
| 6,674,475 B1 | 1/2004 | Anderson |
| 6,677,929 B2 | 1/2004 | Gordon et al. |
| 6,703,599 B1 | 3/2004 | Casebolt et al. |
| 6,737,636 B2 | 5/2004 | Dietz et al. |
| 6,774,351 B2 | 8/2004 | Black |
| 6,774,915 B2 | 8/2004 | Rensberger |
| 6,795,056 B2 | 9/2004 | Norskog et al. |
| 6,809,723 B2 | 10/2004 | Davis |
| 6,819,314 B2 | 11/2004 | Black |
| 6,823,077 B2 | 11/2004 | Dietz et al. |
| 7,042,575 B2 * | 5/2006 | Carlisle et al. ............. 356/498 |
| 7,138,620 B2 * | 11/2006 | Trisnadi et al. ............. 250/221 |
| 7,248,345 B2 * | 7/2007 | Todoroff et al. ............. 356/28 |
| 7,268,341 B2 * | 9/2007 | Lehoty et al. ............. 250/221 |
| 7,459,671 B2 * | 12/2008 | Trisnadi et al. ............. 250/221 |
| 7,723,659 B1 * | 5/2010 | Zeng et al. ............. 250/205 |
| 7,728,816 B2 * | 6/2010 | Xu et al. ............. 345/163 |
| 7,737,948 B2 * | 6/2010 | Spurlock et al. ............. 345/166 |
| 7,765,251 B2 * | 7/2010 | Xu et al. ............. 708/445 |
| 2002/0130835 A1 | 9/2002 | Brosnan |
| 2002/0158300 A1 | 10/2002 | Gee |
| 2002/0190953 A1 | 12/2002 | Gordon et al. |
| 2003/0034959 A1 | 2/2003 | Davis et al. |
| 2003/0058506 A1 | 3/2003 | Green et al. |
| 2003/0142288 A1 | 7/2003 | Kinrot et al. |
| 2004/0084610 A1 | 5/2004 | Leong et al. |
| 2004/0189593 A1 | 9/2004 | Koay |
| 2005/0024336 A1 | 2/2005 | Xie et al. |
| 2005/0024623 A1 | 2/2005 | Xie et al. |
| 2005/0083303 A1 | 4/2005 | Schroeder et al. |
| 2005/0259267 A1 * | 11/2005 | Carlisle et al. ............. 356/498 |
| 2006/0091301 A1 * | 5/2006 | Trisnadi et al. ............. 250/226 |
| 2006/0106319 A1 * | 5/2006 | Todoroff et al. ............. 600/476 |
| 2006/0208169 A1 * | 9/2006 | Breed et al. ............. 250/221 |
| 2007/0057157 A1 * | 3/2007 | Trisnadi et al. ............. 250/208.2 |
| 2008/0007526 A1 * | 1/2008 | Xu et al. ............. 345/163 |
| 2008/0154524 A1 * | 6/2008 | Shirley ............. 702/66 |
| 2009/0040062 A1 * | 2/2009 | Lang et al. ............. 340/686.1 |

OTHER PUBLICATIONS

Written Opinion for Application No. PCT/US2008/009397 dated Dec. 3, 2008; 6 pages.

* cited by examiner

2-Dimensional Comb Detector Array

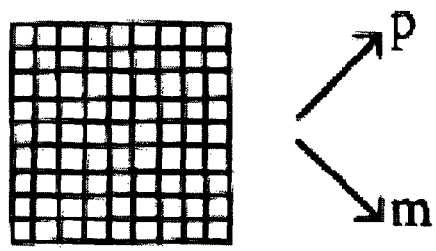
Fig. 3. The natural axes of the sensor 'p' and 'm'
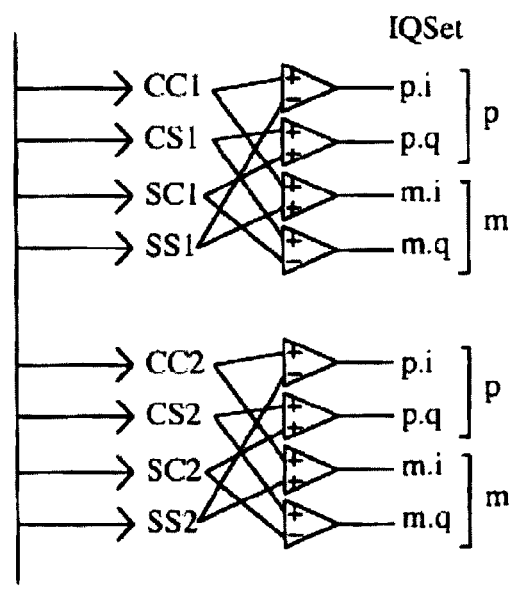
Fig. 4. Generating the In-Phase and Quadrature components along the P and the M axes

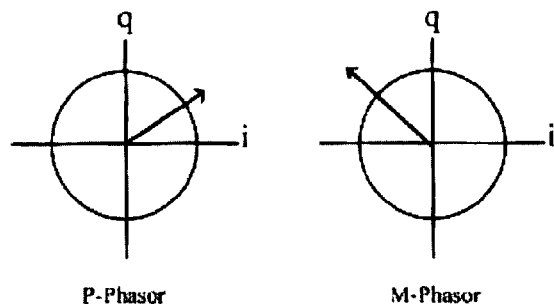
Fig. 5. Displacement along the P and the M direction represented as a Phasor.
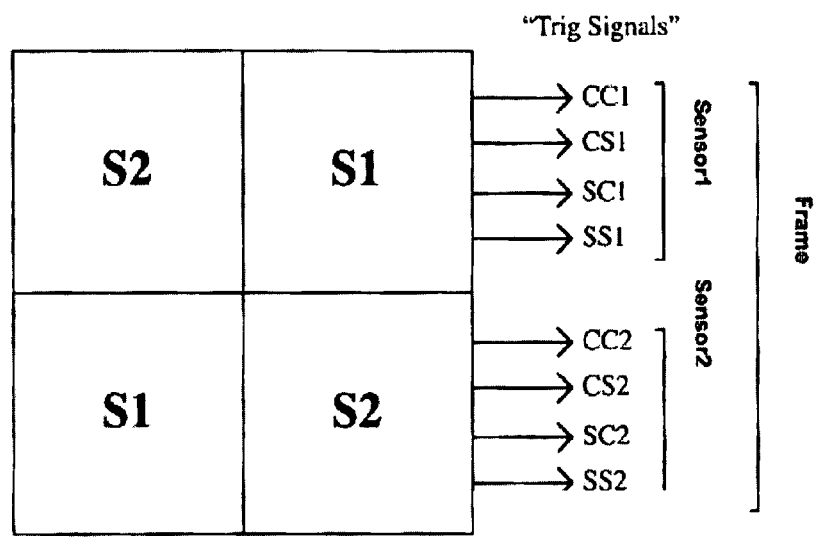
FIG. 6

Fig. 7. Angular displacement between two successive frames.

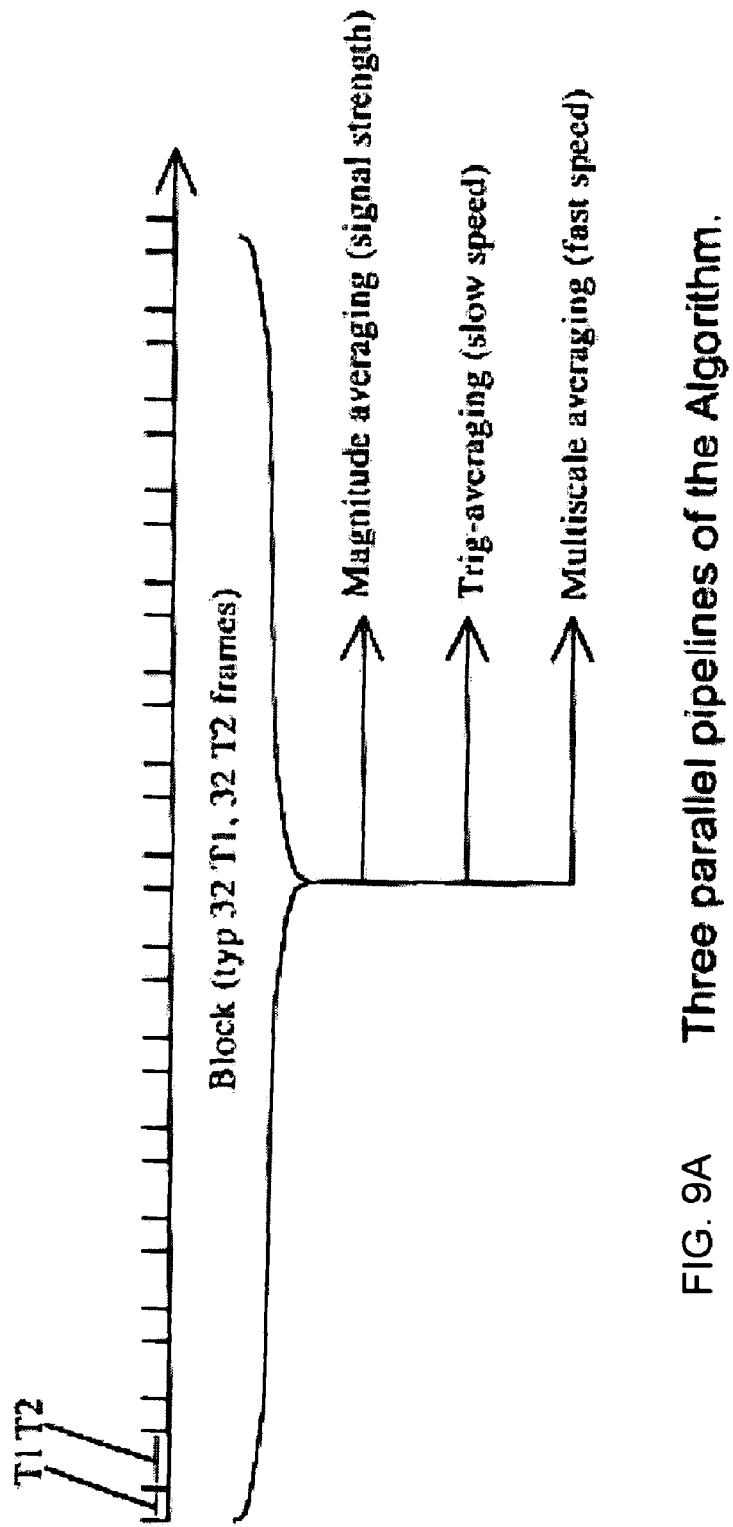
FIG. 9A  Three parallel pipelines of the Algorithm.

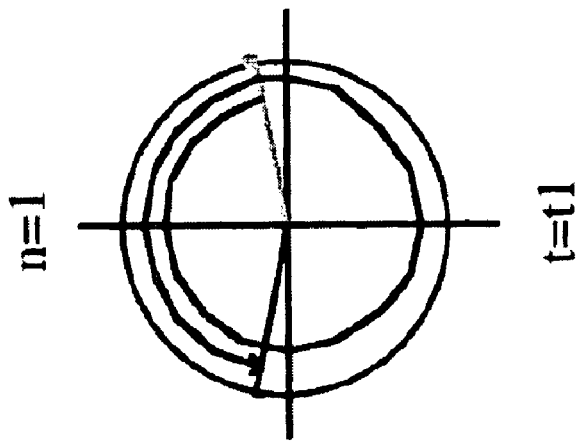
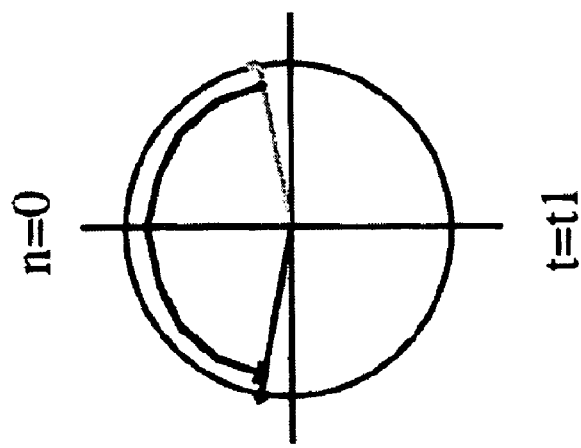
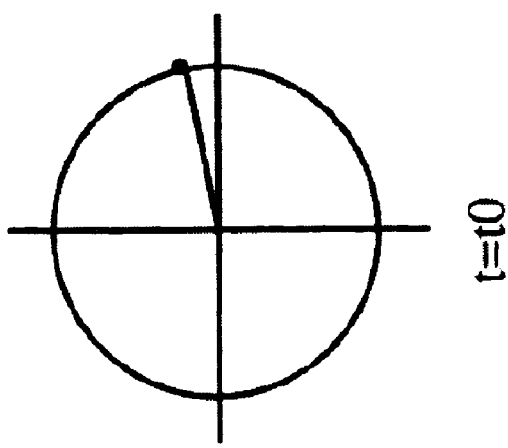
FIG. 11

FIG. 12  Two different Frame Sampling Intervals $T_1$ and $T_2$

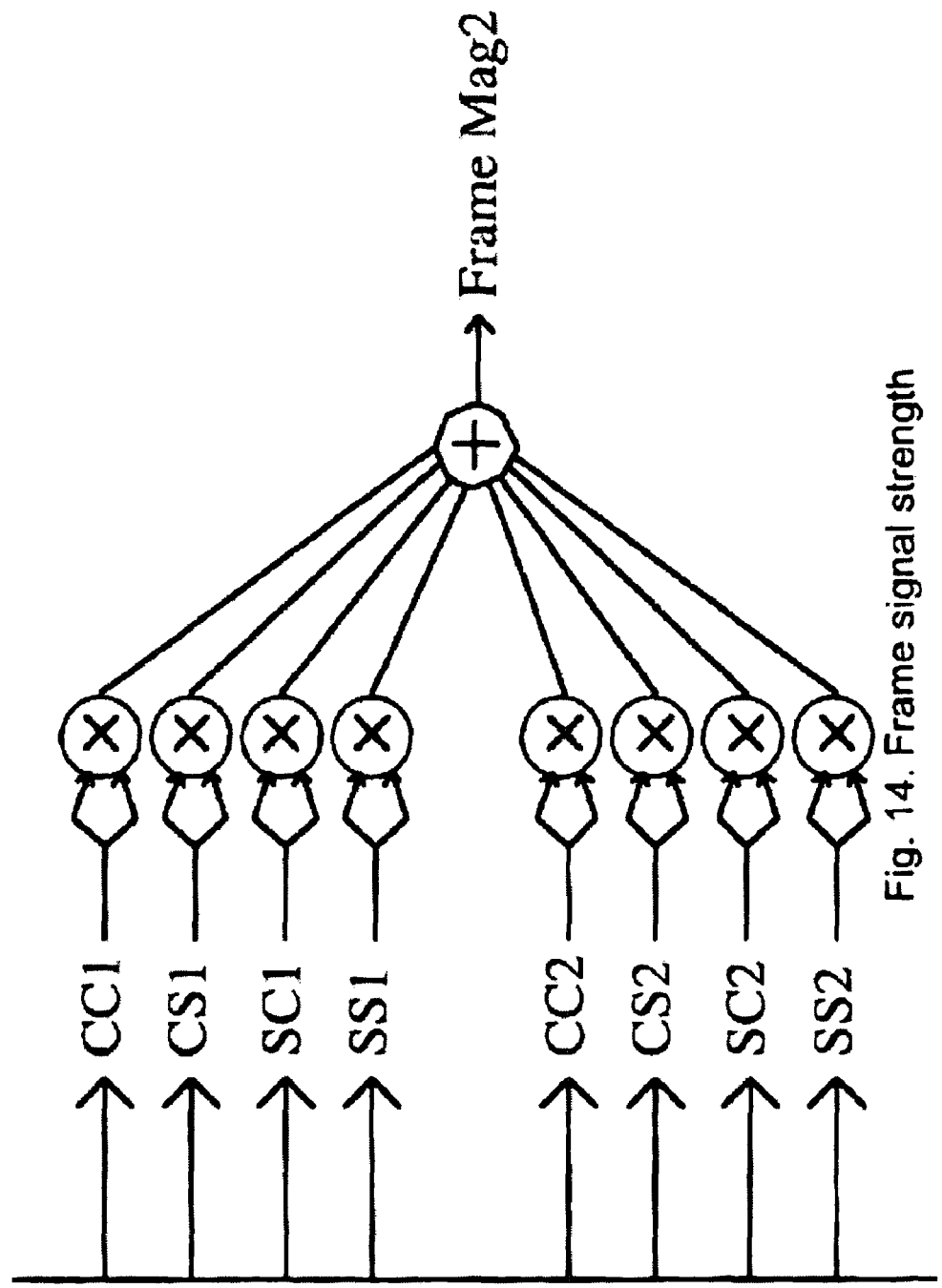

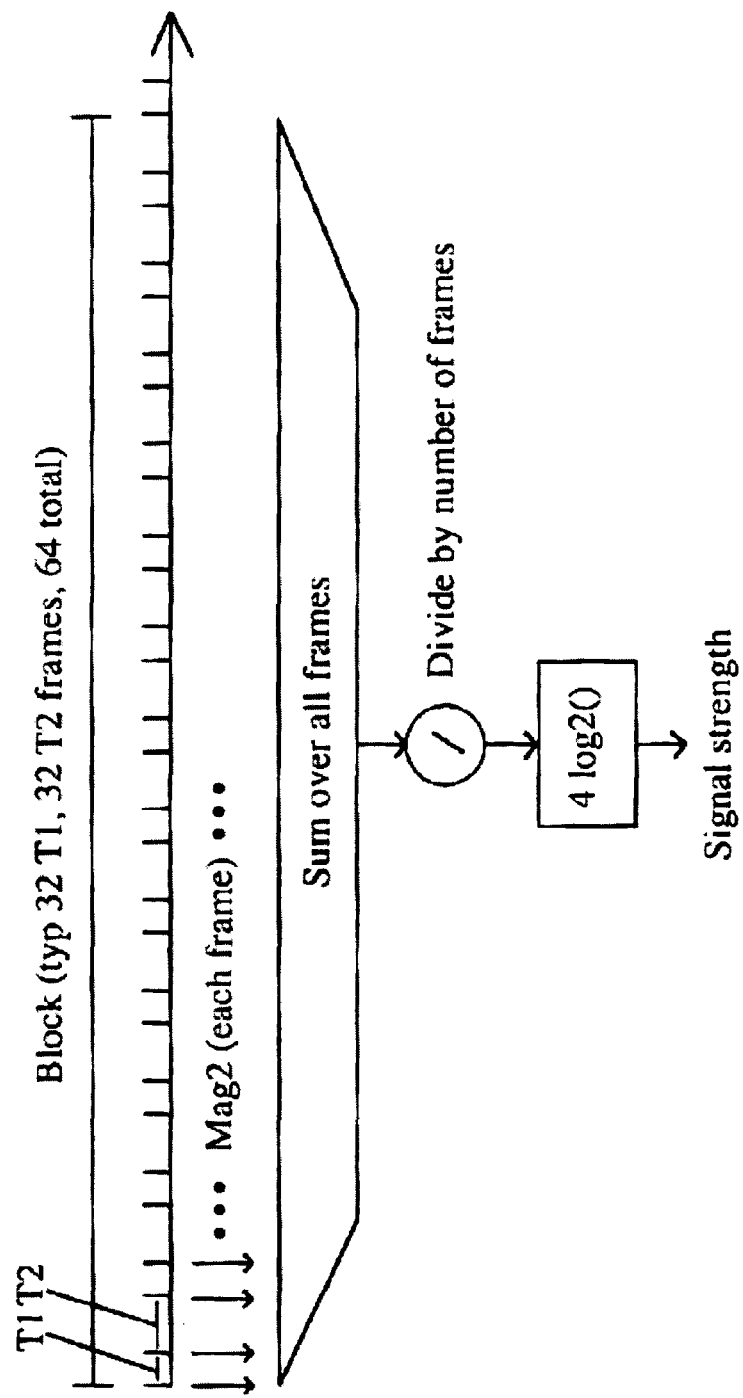
Fig. 15. Block Signal Strength

PROCESSING METHODS FOR SPECKLE-BASED MOTION SENSING

TECHNICAL FIELD

The present invention relates generally to an optical positioning device (OPD), and methods of sensing movement using same.

BACKGROUND

Data input devices, such as computer mice, touch screens, trackballs and the like, are well known for inputting data into and interfacing with personal computers and workstations. Such devices allow rapid relocation of a cursor on a monitor, and are useful in many text, database and graphical programs. A user controls the cursor, for example, by moving the mouse over a surface to move the cursor in a direction and over distance proportional to the movement of the mouse.

Computer mice come in both optical and mechanical versions. Mechanical mice typically use a rotating ball to detect motion, and a pair of shaft encoders in contact with the ball to produce a digital signal used by the computer to move the cursor. One problem with mechanical mice is that they are prone to inaccuracy and malfunction after sustained use due to dirt accumulation, etc. In addition, the movement and resultant wear of the mechanical elements, particularly the shaft encoders, necessarily limit the useful life of the device.

One solution to the above-discussed problems with mechanical mice has been the development of mice using an optical navigation system. These optical mice have become very popular because they provide a better pointing accuracy and are less susceptible to malfunction due to accumulation of dirt.

In a surface-agnostic motion detector, a surface is illuminated in such a way as to create a unique pattern on the surface that can be tracked by an optical sensor. In LED mice, the surface is illuminated by an LED at grazing incidence so that tiny irregularities in the surface cast shadows, creating a non-uniform random pattern. The pattern is imaged onto a detector array. The offset of this pattern versus the position of the sensor is then tracked over time.

In laser-based sensors, a semiconductor laser (typically a VCSEL) is used to illuminate the surface at near-normal incidence. The spectral coherence of the laser and the wavelength-scale irregularities in the surface create an interference pattern, known as speckle, on the surface. The speckle pattern is imaged onto a detector array. The offset of this pattern versus the position of the sensor is then tracked over time.

A speckle-based sensor offers several potential advantages over a LED-based sensor. A laser can be more power efficient than an LED, offering power savings. (Against this benefit must be set the fact that the maximum output power of lasers is limited by various regulations, whereas LEDs are subject to no such limits.) Speckle forms on any surface that is not optically-flat (essentially, all surfaces), whereas oblique LED illumination fails on relatively smooth surfaces. Last, while the spatio-spectral properties of the LED-illuminated signal depend strongly on the roughness of the specific surface being illuminated, the spatio-spectral properties of the speckle pattern are determined primarily by the receiving optics (part of the sensor) and thus can be controlled quite closely. Thus, from a purely performance standpoint, laser illumination can be made to work across a wider range of surfaces.

There are two main approaches to motion detection. In so-called "correlation detectors" a snapshot is taken of the illumination pattern at two sequential times and the cross-correlation of the two images is constructed. By detecting the peak in the correlation, one can determine the magnitude and direction of motion that occurred between the two snapshots. The advantage of the correlation detector is that a range of spatial frequencies participate in the correlation, so there is no problem with fading. The cost is that a correlation is computationally expensive, necessitating simplifications (small arrays, grouping of pixels into super-pixels) that can degrade the performance of the sensor relative to its theoretical potential.

The second approach, which is the focus of this document, is a so-called "comb detector," in which successive snapshots are correlated not against each other, but against one or more fixed reference patterns that are embedded within the sensor itself. Each reference pattern is typically chosen to pick out a single spatial frequency in the optical speckle pattern; by measuring the phase of each spatial frequency, it is possible to determine the direction and magnitude of motion between successive snapshots. Because the reference pattern is fixed in the hardware, one can optimize the hardware so that relatively few mathematical operations are required in the digital domain and some processing can be performed in the analog domain (e.g., wire-summing). Comb detectors can use detectors in many patterns, both one-dimensional and two-dimensional arrangements.

However, because only a small number of spatial frequencies are probed, careful attention must be paid during the signal processing to overcome potential limitations associated with signal fading, the inherent randomness of the optical signal, and issues associated with aliasing.

The present disclosure describes the novel signal process techniques for speckle-based motion sensors.

BRIEF DESCRIPTION OF THE DRAWINGS

These and various other features and advantages of the present invention be understood more fully from the detailed description that follows and from the accompanying drawings, which however, should not be taken to limit the appended claims to the specific embodiments shown, but are for explanation and understanding only, where:

FIG. 3 is a schematic diagram showing natural (p and m) axes of a sensor in accordance with an embodiment of the invention.

FIG. 4 is a schematic diagram showing the generation of the in-phase and quadrature components along the p and m axes in accordance with an embodiment of the invention.

FIG. 5 is a schematic diagram depicting p and m phasors in accordance with an embodiment of the invention.

FIG. 6 is a schematic diagram showing an array divided into regions for two sensors (Sensor1 and Sensor2) in accordance with an embodiment of the invention.

FIG. 9A is a schematic diagram showing three parallel DSP pipelines in accordance with an embodiment of the invention.

FIG. 11 is a schematic diagram depicting phase wrapping due to high speed motion in accordance with an embodiment of the invention.

FIG. 14 is a schematic diagram showing computation of a frame signal strength in accordance with an embodiment of the invention.

FIG. 15 is a schematic diagram showing computation of a block signal strength in accordance with an embodiment of the invention.

DETAILED DESCRIPTION

The disadvantage of prior technology was that there was significant jitter noise at zero or low motion ("dwell"), inaccuracy as velocity approached the Nyquist limit, and flyaway under certain conditions when the motion exceeded the Nyquist limit.

The new technology disclosed herein reduces slow motion noise (largely eliminating jitter), provides higher accuracy under faster motions (important for position sensor applications), and allows the accurate measurement of speeds above the Nyquist limit.

1D Comb-Array

Figure 1A:
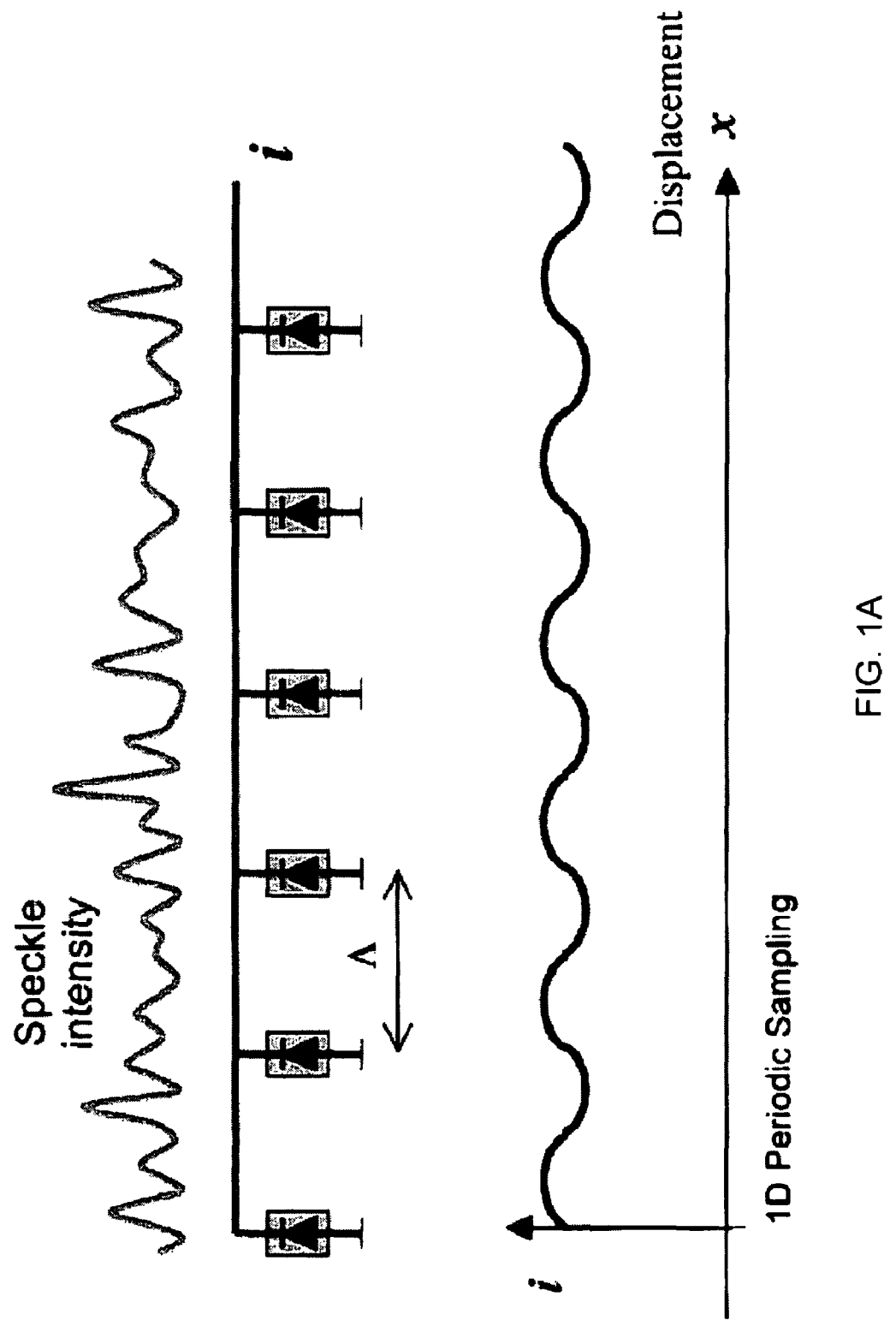
FIG. 1A is a schematic diagram depicting one-dimensional (1D) periodic sampling in accordance with an embodiment of the invention.

FIG. 1A is a schematic diagram depicting one-dimensional (1D) periodic sampling. As shown, photo-detectors (for example, photodiodes) are placed at regular intervals, with period $\Lambda$. As further shown, current i will be periodic with the displacement because the photodiode array "sees" mostly the same speckle pattern when moved a distance $\Lambda$. The current i has a large DC component.

Figure 1B:
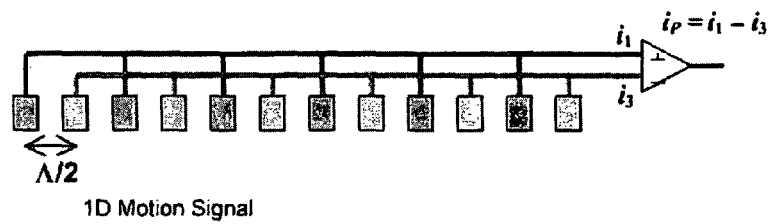
FIG. 1B is a schematic diagram showing how motion in 1D can be detected in accordance with an embodiment of the invention.

FIG. 1B is a schematic diagram showing how motion in 1D can be detected. As shown, the photodiodes are wired together in a manner so as to give two different currents, $i_1$ and $i_3$. The following equations show the two current signals, $i_1$ and $i_3$, from the photodiodes wired according to FIG. 1B, where x is the displacement of the surface along the detector array and $\Lambda$ is the array period.

$$i_1 = A + B\cos\left(\frac{2\pi x}{\Lambda}\right) \quad (0.1)$$

-continued
$$i_3 = A + B\cos\left(\frac{2\pi(x - \Lambda/2)}{\Lambda}\right) = A - B\cos\left(\frac{2\pi x}{\Lambda}\right)$$

By taking the difference of the two current signals from equations (0.1), the in-phase current may be obtained according to equation (0.2), given below.

$$i_P = i_1 - i_3 = 2B\cos\left(\frac{2\pi x}{\Lambda}\right) \quad (0.2)$$

Taking the difference of the two current signals from equations (0.1) effectively removes the DC component and all even harmonics, doubling the fundamental and all odd harmonics. However, a deficiency of this configuration is that the in-phase current alone does not distinguish left-motion from right-motion since both motions produce a sinusoidal signal.

Figure 1C:
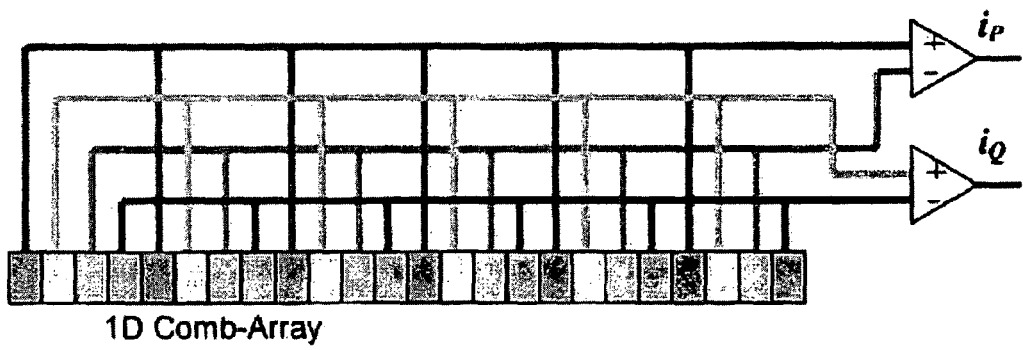
FIG. 1C is a schematic diagram depicting a 1D comb detector array in accordance with an embodiment of the invention.

An improvement is shown in FIG. 1C, which is a schematic diagram depicting a 1D comb detector array with additional detectors and signal processing, which allows the discrimination of left- and right-motion. As shown, the comb-detector array is wired so as to provide both in-phase, $i_P$, and quadrature, $i_Q$, currents. Equations (0.3) for the in-phase and quadrature currents are provided below.

$$i_P = i_1 - i_3 = 2B\cos\left(\frac{2\pi x}{\Lambda}\right) \quad (0.3)$$
$$i_Q = i_2 - i_4 = 2B\sin\left(\frac{2\pi x}{\Lambda}\right)$$

Figure 1D:
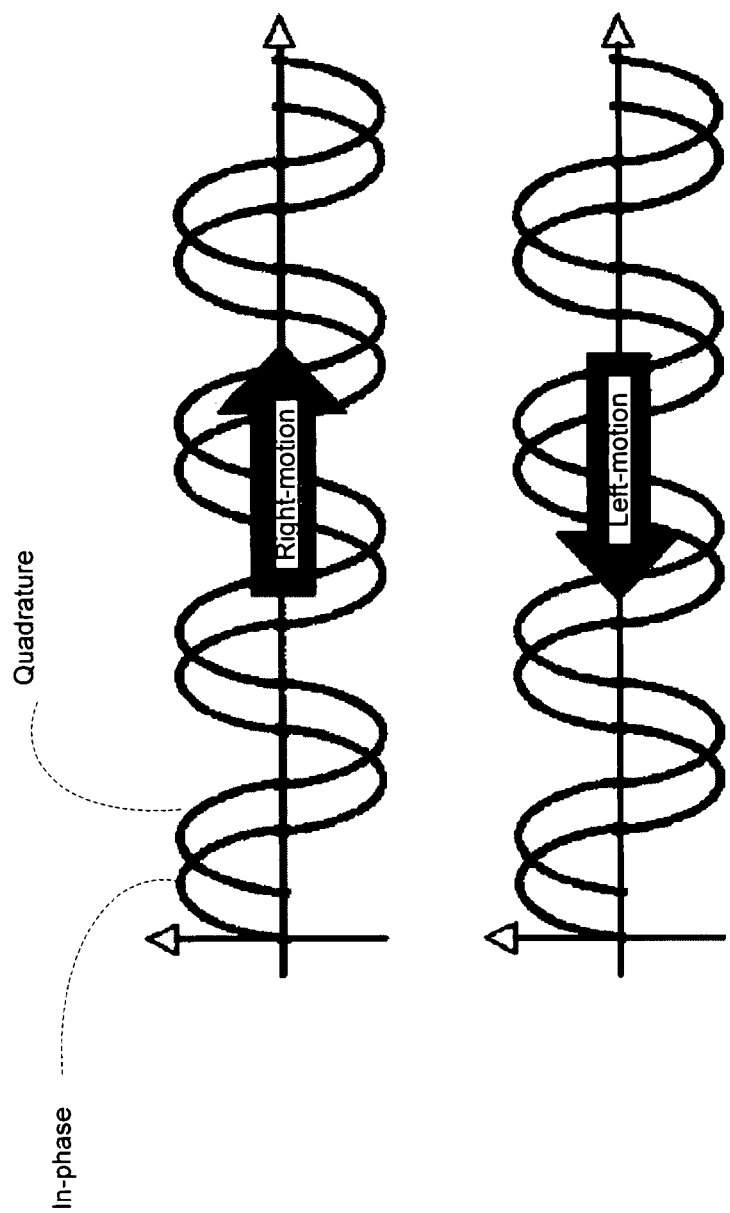
FIG. 1D shows the in-phase and quadrature currents plotted against time and further shows arrows indicating directions of motion in accordance with an embodiment of the invention.

By using both the in-phase and quadrature currents, left-motion may be distinguished from right-motion. FIG. 1D shows the in-phase and quadrature currents plotted against time and further shows arrows indicating directions of motion. As seen, the direction of motion may be determined from whether the in-phase current signal is a quarter period ahead or behind from the quadrature current signal.

A convenient mathematical interpretation of the in-phase and quadrature components is that they are the real and imaginary parts, respectively, of a complex phasor. As the two signals vary sinusoidally, the complex phase of the associated phasor spins around in the complex plane, with left- or right-motion corresponding to clockwise or counterclockwise rotation of the complex phasor. Thus, the direction of motion can be unambiguously determined from the direction of rotation, and because there is a one-to-one relationship between the distance moved and the change of complex phase, it is also possible to determine distance moved by measuring the complex phase and its change.

Although we have represented the signals as pure sinusoids, we note that because of noise in the system and the randomness of the speckle pattern, the true signals are only roughly sinusoidal and therefore vary quasi-periodically with distance, rather than being perfectly periodic.

A deficiency of the configuration in FIGS. 1A-1C is that they can only detect motion along a single direction, and in fact display poor performance for even partially off-axis motion.

2D Comb-Array

Figure 2:
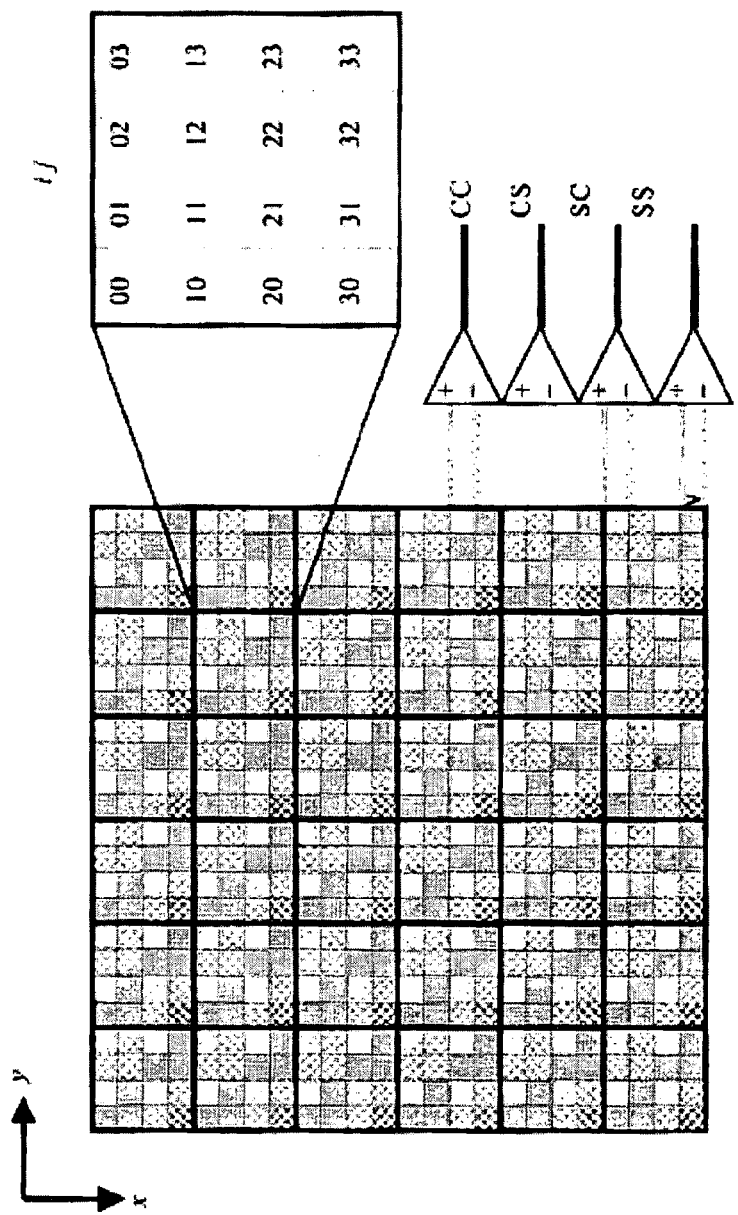
FIG. 2 is a schematic diagram of a two-dimensional (2D) comb detector array in accordance with an embodiment of the invention.

An improvement is shown in FIG. 2, which is a schematic diagram of a two-dimensional (2D) comb detector array that can measure motion in any direction in the plane. Here, elements with a same position within each 4×4 cell are wired-sum to yield the signal S (with i, j=0, 1, 2, 3).

Provided below are equations relating to signal frame processing. The wired-sum signals are further combined to give the signals CC, CS, SC and SS given in equation (1).

$$CC = S_{00} + S_{22} - S_{02} - S_{20}$$

$$CS = S_{01} + S_{23} - S_{03} - S_{21}$$

$$SC = S_{10} + S_{32} - S_{12} - S_{30}$$

$$SS = S_{11} + S_{33} - S_{13} - S_{31}. \quad (1)$$

Signal Frame Processing

We refer to the four signals CC, CS, SC and SS as "trigonometric" or "trig" signals; they contain within themselves the in-phase and quadrature information in the x and y directions. As shown in equation (2), using trigonometry identities, the harmonic products may be converted to simple harmonics (of sum and difference).

$$\cos(K_x x + K_y y) = CC - SS$$

$$\sin(K_x x + K_y y) = SC + CS$$

$$\cos(K_x x - K_y y) = CC + SS$$

$$\sin(K_x x - K_y y) = SC - CS. \quad (2)$$

If desired the coordinate system or the array may be rotated by 45 degrees to get expression in pure x and y. At any rate, the 2D displacement may then be determined in analogy to a pair of one-dimensional (1D) displacements. In practice, the values of $K_x$ and $K_y$ may be taken to be the same. Assuming $K_x = K_y = K$, equation (2) may be written as equation (3).

$$\cos(K(x+y)) = CC - SS$$

$$\sin(K(x+y)) = SC + CS$$

$$\cos(K(x-y)) = CC + SS$$

$$\sin(K(x-y)) = SC - CS. \quad (3)$$

It is natural at this point to introduce a rotated coordinate system, whose axes we shall call p and m (for "x plus y" and "x minus y"). Substituting x+y=p and x−y=m in equation (3), we obtain an in-phase (i) phasor and a quadrature (q) phasor for both the p and m directions. The p and m axes are shown in FIG. 3. The four phasors are given in equation (4).

$$i_+ = \cos(Kp) = CC - SS$$

$$q_+ = \sin(Kp) = SC + CS$$

$$i_- = \cos(Km) = CC + SS$$

$$q_- = \sin(Km) = SC - CS. \quad (4)$$

As before, the in-phase and quadrature signals may be interpreted as the real and imaginary parts, respectively, of a complex phasor. By constructing the in-phase and quadrature components corresponding to the p and m axes, we can then compute the displacements along the p and m axes and then convert them to the x and y axes. FIG. 4 shows how the in-phase (i) and the quadrature (q) components along the p and the m axes are computed for each individual frame.

For convenience of mathematical analysis, the complex phasor for each of the p and m directions may be represented in a phasor diagram, as shown in FIG. 5. These signals are typically measured at a series of discrete time samples. We will refer to the pair of (in-phase, quadrature) signals at a discrete time as a "frame signal" or simply "frame."

2D Comb Array—Signal Aggregation

The in-phase and quadrature signals are responsive to particular spatial frequency components K of the speckle pattern along the p and m axes. However, because of the random nature of speckle, at any given moment the amplitude of any given spatial frequency could be quite low, resulting in fading of the corresponding complex phasor. In order to mitigate fading, the 2D comb-array may be divided into two or more regions. An array divided into regions for two sensors (Sensor1 and Sensor2, or S1 and S2) is shown in FIG. 6 in accordance with an embodiment of the invention.

During motion, the in-phase and quadrature signals change, corresponding to a rotation of the complex phasor. An angular rotation between two successive frames is shown for both Sensor1 and Sensor2 in FIG. 7. The angular rotation corresponds to a physical displacement of the surface being probed. While the location of the phasor for the (n−1)th frame could be different for both of the sensors, but the displacement (ΔΦ) between two successive frames should be the same, at least in an ideal case.

Velocity Vector

Per this disclosure, two successive frames may be processed into a single phasor, named a "b-vector", from which the angular rotation can be easily determined. The phase of the b vector gives the change in phase per time increment, from which the displacement of the surface may be determined. As shown below, the b-vector is made up of two components, u and v. These, too, can be interpreted as real and imaginary parts of a complex phasor.

$$b_{+,n} \equiv (u_{+,n}, v_{+,n}) = \left( \left\{ \sum_{s=sensor1}^{sensor2} [i_{+,n} \times i_{+,(n-1)} + q_{+,n} \times q_{+,(n-1)}]_s \right\}, \right.$$
$$\left. \left\{ \sum_{s=sensor1}^{sensor2} [q_{+,n} \times i_{+,(n-1)} - i_{+,n} \times q_{+,(n-1)}]_s \right\} \right)$$

$$b_{-,n} \equiv (u_{-,n}, v_{-,n}) = \left( \left\{ \sum_{s=sensor1}^{sensor2} [i_{-,n} \times i_{-,(n-1)} + q_{-,n} \times q_{-,(n-1)}]_s \right\}, \right.$$
$$\left. \left\{ \sum_{s=sensor1}^{sensor2} [q_{-,n} \times i_{-,(n-1)} - i_{-,n} \times q_{-,(n-1)}]_s \right\} \right)$$

The relationship between b-vectors and frames can be easily understood; if we represent the frame information by the complex pair $$f_{\pm,n} \equiv (i_{\pm,n}, q_{\pm,n}) = i_{\pm,n} + j q_{\pm,n},$$

(where we use $j \equiv \sqrt{-1}$ to avoid ambiguity), then the corresponding b-vector is simply given by $$b_{\pm,n} = f_{\pm,n} f_{\pm,(n-1)}^*.$$

Note that each b-vector is a product of two complex frame signals (one of them conjugated); we refer to any two such signals as a "frame signal pair", and note that the b-vector contains the phase change (and therefore distance displacement) that occurred between the two signals of the frame pair.

With this definition, the phase change in each direction from time (n−1) to time (n) is simply given by $$\Delta \phi_{+,n} = \text{ARCTAN}(u_{+,n}, v_{+,n})$$

$$\Delta \phi_{-,n} = \text{ARCTAN}(u_{-,n}, v_{-,n}),$$

where we use the 2-component (4-quadrant) arctangent function. We can write this alternatively as $$\Delta \phi_{\pm,n} = \angle b_{\pm,n}.$$

Figure 7:
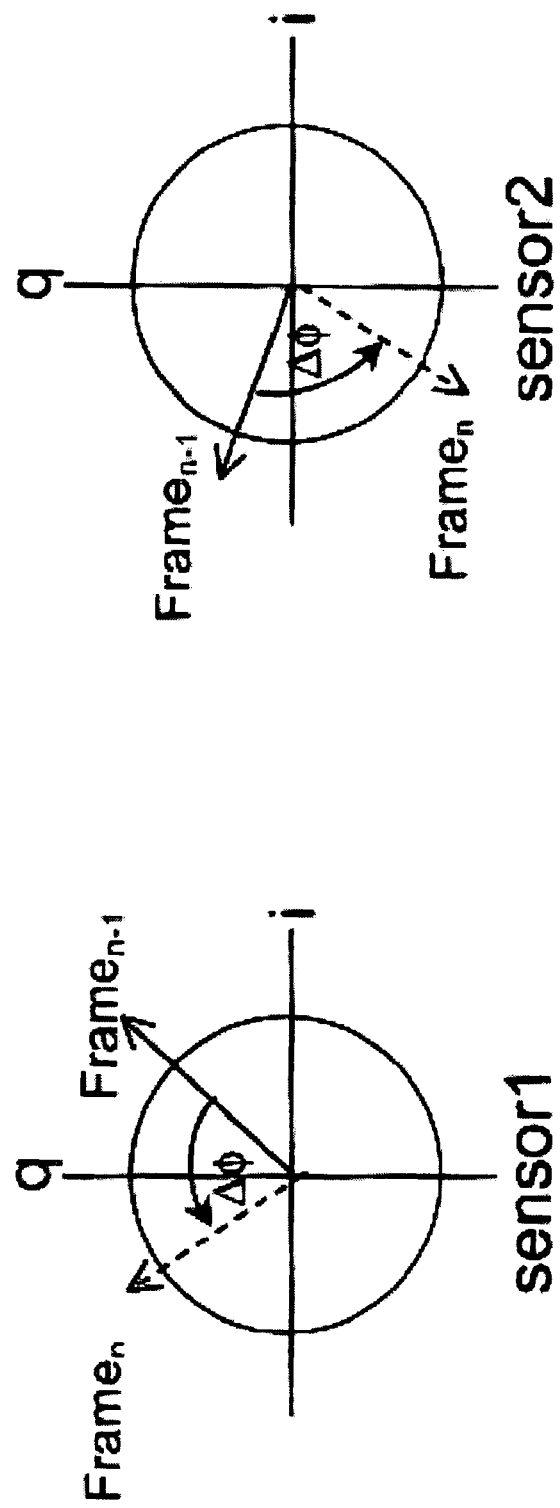
FIG. 7 is a schematic diagram showing angular displacement between two successive frames for both sensors in FIG. 6 in accordance with an embodiment of the invention.

As noted earlier, due to the randomness of speckle, the signal magnitude may at any given moment become arbitrarily small, which is called "fading." By utilizing two sensor regions S1 and S2, it is possible to obtain improved performance because the probability of fading in either sensor is independent of the other sensor, and therefore, the probability of fading in both is extremely small. Since a phase change $\Delta\phi_{\pm,n}$ may be computed for each sensor, we can use the signals from both sensors to compute a more accurate phase change. As shown in FIG. 7, while the absolute phases of the two sensors at any given time will have no particular relationship, the phase changes produced by the two sensors across the same interval should, in principle, agree with one another. If we assume a single phase change applies to both sensors and calculate the phase change that minimizes the error (in the least-squares sense) between the two sensors S1 and S2, we find that the minimum-error phase change is given by $$\Delta\phi_{\pm,n} = \angle(b_{\pm,n}^{(1)} + b_{\pm,n}^{(2)}),$$

where $b_{\pm,n}^{(1)}$ is the b-vector computed for sensor S1 and $b_{\pm,n}^{(2)}$ is the b-vector computed for sensor S2. In the same way, it can be shown that for any number of independent sets of frame signal pairs, the phase change resulting from a least-square-error assumption is given by simply summing the associated b-vectors.

Velocity Averaging

Figure 8:
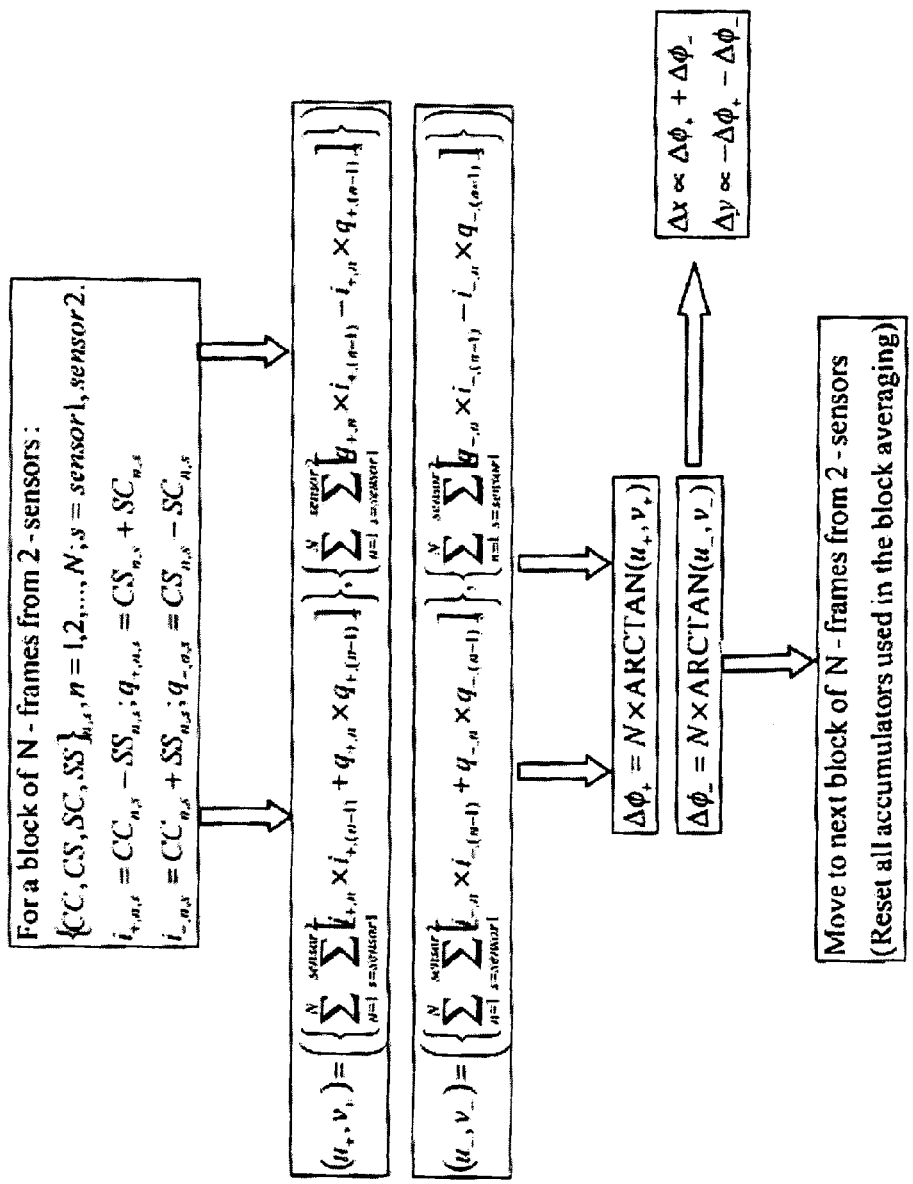
FIG. 8 is a flow chart showing a method of averaging b-vectors over an entire block in accordance with an embodiment of the invention.

While fading can be mitigated by summing b-vectors from two independent sensors, there is still the (more remote) probability that both sensors will fade at the same time. However, fading is a transient phenomenon; if the surface is moving, a faded signal will presently un-fade. Thus, it is possible to obtain improved performance by combining b-vectors not just from two different sensors but from multiple times as well. We can take multiple measurements of frames (and b-vectors) over a series of sequential times, called a block. FIG. 8 is a flow chart showing a method of averaging b-vectors over an entire block in accordance with an embodiment of the invention. (Although we refer to this as "b-vector averaging," since only the phase of the b-vector matters, not the magnitude, we do not need to divide by the number of b-vectors. Hence, "b-vector summing" accomplishes the same goal.) Averaging the b-vectors for the entire block of frames (N) offers further improvement beyond fading mitigation because it effectively averages the noise of the individual b-vector computation. This improves tracking by reducing noise.

Three Parallel DSP Pipelines

A disadvantage of conventional signal processing techniques for comb detectors is that any given technique that works well for slow speeds has limitations when used at high speeds and vice versa. An improvement that is an embodiment of this invention is to create two or more parallel pipelines that process the frame signals in different ways that are suited to different speeds of motion, and then to select from between the different computed motion values based on the properties of the computed signals.

FIG. 9A is a schematic diagram showing three parallel digital signal processing (DSP) pipelines in accordance with an embodiment of the invention. As shown, the sensor takes snapshots at alternating time intervals, T1 and T2. These intervals T1 and T2 are of different durations, for reasons that will be explained shortly. As further shown, a block of frames goes into the three parallel processing stages. A block may comprise, for example, 32 T1 frames and 32 T2 frames. In other words, a block may comprise 32 frame pairs, each frame pair including a T1 frame and a T2 frame.

The three parallel processing pipelines may comprise a magnitude averaging pipeline, a "trig-averaging" pipeline, and a multiscale averaging pipeline. The magnitude averaging pipeline is used to determine a signal strength so as to measure a quality level of the signal that is used to track motion. Hence, the magnitude averaging pipeline may be advantageously used to distinguish between no (or negligible) motion and some (useful) motion and to avoid tracking errors when the signal is too weak. This allows the sensor to stop outputting motion data when the signal is too low and so avoid spurious or noisy motion reports from the sensor. The trig-averaging pipeline may be advantageously used to track motion at slow speeds. Finally, the multiscale averaging pipeline may be advantageously used to track motion at fast speeds.

Figure 9B:
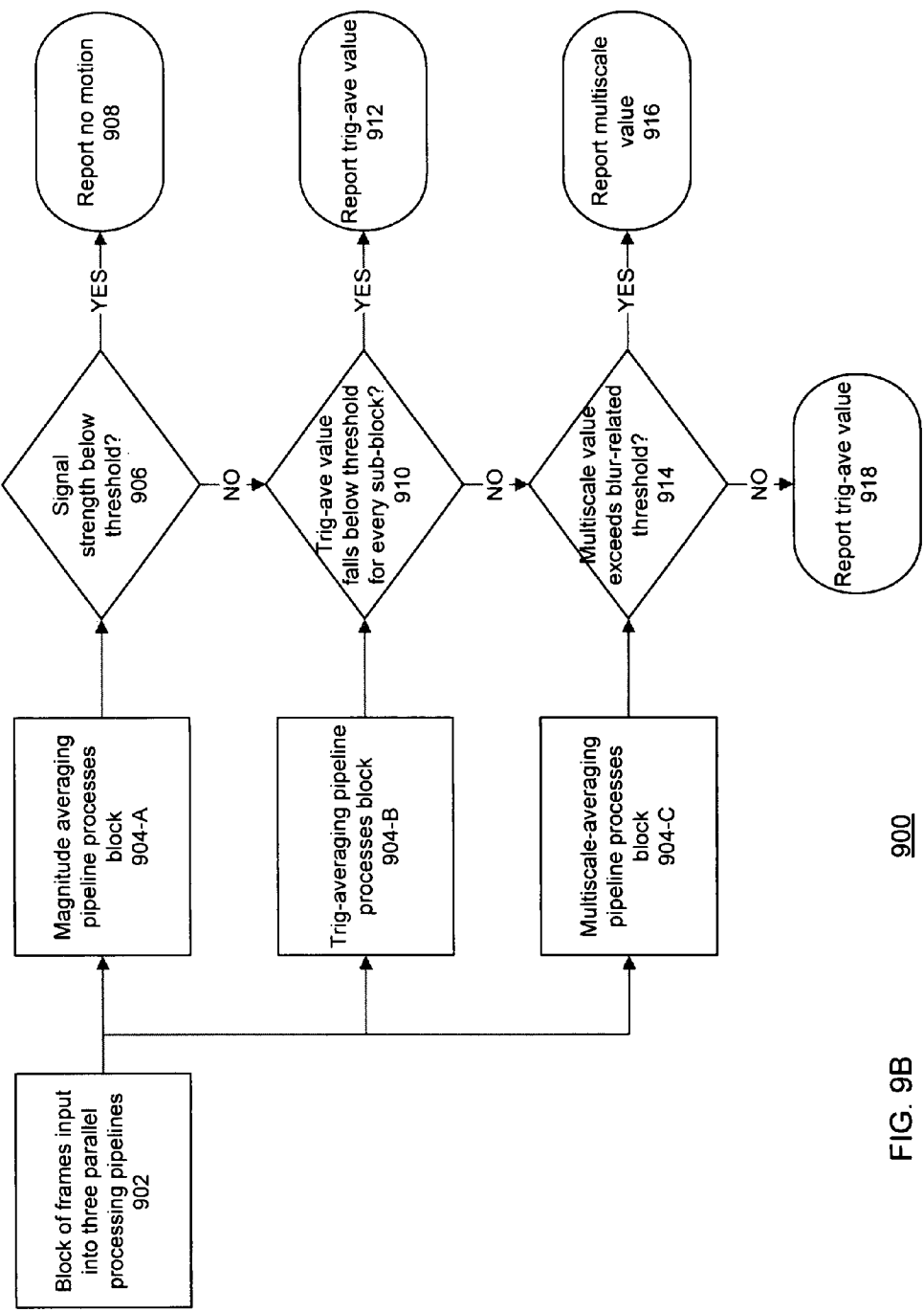
FIG. 9B is a flow chart of tracking motion using a speckle-based motion sensor in accordance with an embodiment of the invention.

FIG. 9B is a flow chart depicting a method 900 of tracking motion using a speckle-based motion sensor in accordance with an embodiment of the invention. As shown, a block of frames is input 902 into the three parallel processing pipelines shown in FIG. 9A. The magnitude-averaging pipeline processes 904-A the block. In parallel, the "trig-averaging" pipeline processes 906-B the same block. Also in parallel, the multiscale-averaging pipeline processes 906-C the same block. It should be noted that while the processing is conceptually performed in parallel, in practice the steps may be performed sequentially (or even interwoven) to make best use of signal processing resources.

The decision algorithm may proceed as follows. A first determination 906 is made as to whether the signal strength value from the magnitude-averaging pipeline exceeds a threshold. The threshold is set such that signal strengths below the threshold correspond to low quality signals which may be associated with no motion or a negligible amount of motion. Hence, if the signal strength is below the threshold, then no motion is reported 908, else the process moves on to the next determination 910.

The next determination 910 relates to values from the trig-averaging pipeline. In accordance with an embodiment of the invention, if the trig-average value falls below a slow-motion-related threshold for every sub-block of the block of frames, then the motion is deemed to be slow motion which is more accurately measured by trig-averaging. As such, the trig-averaging value is then reported 912. Otherwise, the process moves on to the next determination 914.

The next determination 914 relates to values from the multiscale-averaging pipeline. In accordance with an embodiment of the invention, if the multiscale-average value exceeds a blur-related threshold, then the motion is deemed to be possibly fast motion which is more accurately measured by multiscale-averaging. For example, the blur-related threshold is a threshold value above which blurring is caused in trig-averaging. If the blur-related threshold is exceeded, then the multiscale-averaging value is then reported 916. Else, if the multiscale-average value is below the blur-related threshold, then the trig-averaging value may be reported 918 as the trig-averaging value is likely to be more accurate than the multiscale-averaging value.

Trig-Averaging DSP Pipeline

We now describe the details of the Trig-Averaging pipeline. For a block of N frame-pairs, the in-phase (i) and quadrature (q) components of the '+' and the '−' phasors are computed as shown below for both the sensors.

$$i_{+,k,t,s} = CC_{k,t,s} - SS_{k,t,s}, \tag{5}$$

$$q_{+,k,t,s} = CS_{k,t,s} + SC_{k,t,s}, \tag{6}$$

$$i_{-,k,t,s} = CC_{k,t,s} + SS_{k,t,s}, \tag{7}$$

$$q_{-,k,t,s} = CS_{k,t,s} - SC_{k,t,s}, \tag{8}$$

where $CC_{k,t,s}$ represents the CC signal for direction $k \in \{+,-\}$, time interval $t \in \{T1,T2\}$, and sensor $s \in \{S1,S2\}$.

These i and q signals may be referred to herein as the "trig" signals.

Figure 10:
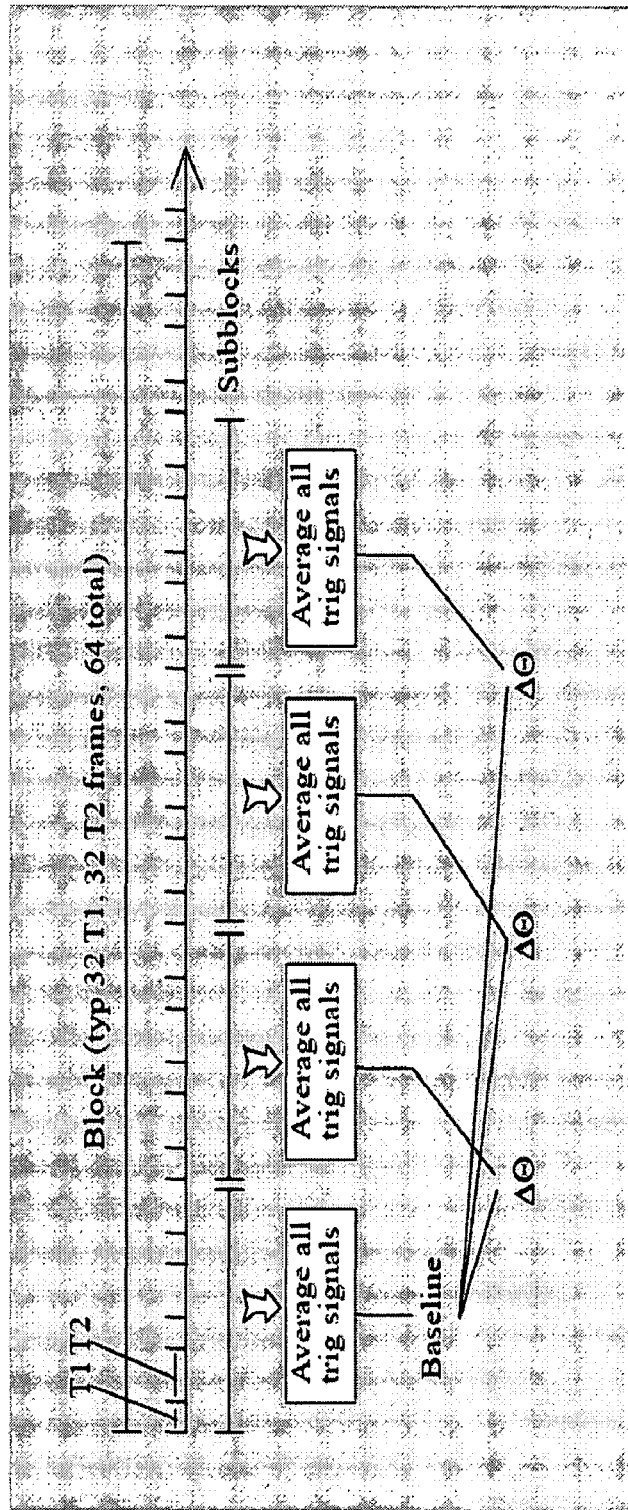
FIG. 10 is a schematic diagram relating to trig-averaging in accordance with an embodiment of the invention.

The trig signals may be slightly varying even in the absence of motion due to electrical noise. This various could result in a report of small spurious motion, i.e., jitter. To eliminate or reduce jitter when there is no motion or slow motion, the trig signals (i,q) are averaged over some number M of T1 and T2 frames within a sub-block before computing $\Delta\phi$ from the aforementioned b-vectors. (A "T1 frame" is a frame preceded by time interval T1; similarly for T2.) A separate average is maintained for each sensor. This procedure is illustrated in FIG. 10.

Thus, for each sub-block "n" of M-frame pairs, where M<N, $$i_{+,n,s} = \sum_{k=n \times M+1}^{(n+1) \times M} [i_{+,k,T_1,s} + i_{+,k,T_2,s}] \quad (9)$$

$$q_{+,n,s} = \sum_{k=n \times M+1}^{(n+1) \times M} [q_{+,k,T_1,s} + q_{+,k,T_2,s}] \quad (10)$$

$$i_{-,n,s} = \sum_{k=n \times M+1}^{(n+1) \times M} [i_{-,k,T_1,s} + i_{-,k,T_2,s}] \quad (11)$$

$$q_{-,n,s} = \sum_{k=n \times M+1}^{(n+1) \times M} [q_{-,k,T_1,s} + q_{-,k,T_2,s}] \quad (12)$$

Thus, in the trig-averaging pipeline, we average all frames within a sub-block. One sub-block is the baseline. We compute $\Delta\theta$ for each sub-block relative to a baseline by summing the b-vectors from both sensors. This is shown by the equations below.

$$(u_{+n}, v_{+n}) = \left( \left\{ \sum_{s=sensor1}^{sensor2} [i_{+,n,s} \times i_{+,base,s} + q_{+,n,s} \times q_{+,base,s}] \right\}, \right.$$
$$\left. \left\{ \sum_{s=sensor1}^{sensor2} [q_{+,n,s} \times i_{+,base,s} - i_{+,n,s} \times q_{+,base,s}] \right\} \right)$$

$$\Delta\Phi_{+,n} = \text{ARCTAN}(u_{+,n}, v_{+,n}) \quad (13)$$

$$\Delta\phi_{+,n} = \Delta\Phi_{+,n} - \Delta\Phi_{+,prev} \quad (14)$$

$$(u_{-n}, v_{-n}) = \left( \left\{ \sum_{s=sensor1}^{sensor2} [i_{-,n,s} \times i_{-,base,s} + q_{-,n,s} \times q_{-,base,s}] \right\}, \right.$$
$$\left. \left\{ \sum_{s=sensor1}^{sensor2} [q_{-,n,s} \times i_{-,base,s} - i_{-,n,s} \times q_{-,base,s}] \right\} \right)$$

$$\Delta\Phi_{-,n} = \text{ARCTAN}(u_{-,n}, v_{-,n}) \quad (15)$$

$$\Delta\phi_{+,n} = \Delta\Phi_{+,n} - \Delta\Phi_{+,prev} \quad (16)$$

When the accumulated phase relative to baseline exceeds a predefined threshold, we reset the baseline sub-block (average frame) to the latest sub-block. This is shown below.

If ($\Delta\Phi_{+,n} > \Delta\Phi_{threshold}$) or ($\Delta\Phi_{-,n} > \Delta\Phi_{threshold}$), then $\{\Delta\Phi_{+,prev}=0; \Delta\Phi_{-,prev}=0\}$; set "base" to current "n" else $\{\Delta\Phi_{+,prev}=\Delta\Phi_{+,n}; \Delta\Phi_{-,prev}=\Delta\Phi_{-,n}\}$ Hence, in trig-averaging, we do not switch the baseline until we exceed some threshold, as opposed to updating the baseline every frame. This is a "conservative" approach, in that we do not change the baseline until we absolutely have to. We do this because, if the baseline is updated every frame, then round-off errors are accumulated that manifest as jitter in the mouse position. Using this conservative algorithm reduces this jitter by literally orders of magnitude when the mouse is stationary, while maintaining tracking when the mouse starts to move.

Displacement along the x and y directions may now be computed as follows.

$$\Delta\phi_+ = \sum_{n=1}^{(N/M)} [\Delta\phi_{+,n}] \quad (17)$$

$$\Delta\phi_- = \sum_{n=1}^{(N/M)} [\Delta\phi_{-,n}] \quad (18)$$

$$\Delta x \alpha (\Delta\phi_+ - \Delta\phi_-) \quad (19)$$

$$\Delta y \alpha (-\Delta\phi_+ - \Delta\phi_-) \quad (20)$$

We then move to the next block of N-frame-pairs (T1/T2) from the two sensors and reset all accumulators used in block averaging.

Trig-averaging offers the advantage that is exhibits very low jitter for slow or no motion. However, it has its limitations. For example, if the phase changes during a sub-block (due to medium or fast motion), signals become blurred. For large phase changes $\Delta\theta > \pi$, the trig signals may sufficiently blurred that they have lost all phase information. In other words, "trig-averaging" (TA) can report a velocity value which may be meaningless (not useful) under medium or fast motion.

Multi-scale-Averaging DSP Pipeline

The limitations of trig-averaging may be overcome at high speed by using a different algorithm that is another embodiment of this invention. First, let us discuss the problem of phase wrapping. FIG. 11 is a schematic diagram depicting phase wrapping due to high speed motion in accordance with an embodiment of the invention. At high speed, the phase change between two consecutive frames can exceed $2\pi$. Hence, at time t1, the n=0 scenario (where the phase wraps halfway around the origin) and the n=1 scenario (where it wraps one-and-a-half times around the origin) cannot be distinguished, unless the phase can somehow be "unwrapped." We accomplish this unwrapping by interlacing measurements taken at two dissimilar time intervals.

Figure 12:
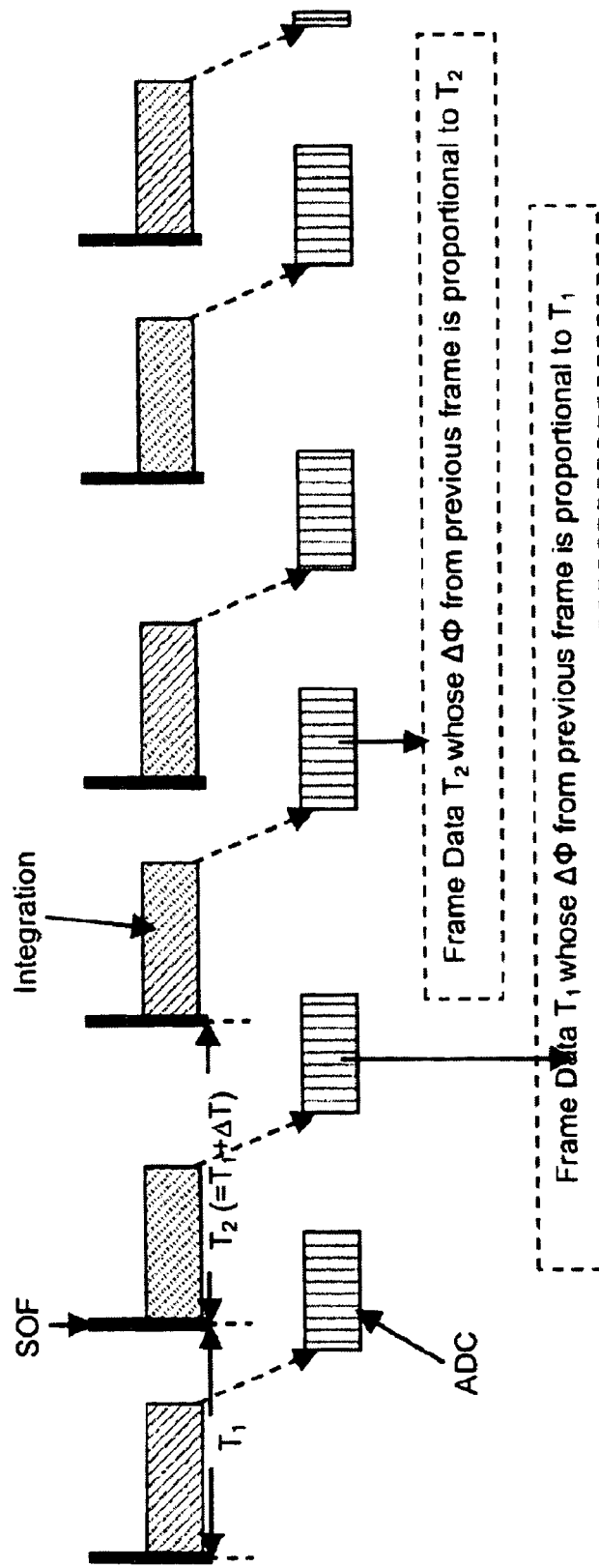
FIG. 12 is a schematic diagram showing two different frame sampling intervals in accordance with an embodiment of the invention.

As shown in FIG. 12, in multi-scale averaging, there are two frame-sampling intervals, T1 and T2. These intervals are interlaced in alternate fashion. The term "SOF" in FIG. 12 stands for "Start of Frame".

For a block of N-frame pairs ($T_1/T_2$) from two sensors, we compute the 'i' and the 'q' components of the '+' and the '−' phasors.

$$i_{+,k,t,s} = CC_{k,t,s} - SS_{k,t,s} \quad (21)$$

$$q_{+,k,t,s} = CS_{k,t,s} + SC_{k,t,s} \quad (22)$$

$$i_{-,k,t,s} = CC_{k,t,s} + SS_{k,t,s} \quad (23)$$

$$q_{-,k,t,s} = CS_{k,t,s} - SC_{k,t,s} \quad (24)$$

where k=1, 2, . . . , N; t=$T_1$, $T_2$; s=sensor1, sensor2.

We then compute the average u and v components of the b-vectors in the '+' and the '−' direction. The b-vectors for the $T_1$ and the $T_2$ frame pairs are computed and averaged separately in an entire block.

$$u_{+,T_1} = \frac{1}{N}\sum_{k=1}^{N}\sum_{s=sensor1}^{sensor2}[i_{+,k,T_1}\times i_{+,(k-1),T_2} + q_{+,k,T_1}\times q_{+,(k-1),T_2}]_s \quad (25)$$

$$v_{+,T_1} = \frac{1}{N}\sum_{k=1}^{N}\sum_{s=sensor1}^{sensor2}[q_{+,k,T_1}\times i_{+,(k-1),T_2} - i_{+,k,T_1}\times q_{+,(k-1),T_2}]_s \quad (26)$$

$$u_{-,T_1} = \frac{1}{N}\sum_{k=1}^{N}\sum_{s=sensor1}^{sensor2}[i_{-,k,T_1}\times i_{-,(k-1),T_2} + q_{-,k,T_1}\times q_{-,(k-1),T_2}]_s \quad (27)$$

$$v_{-,T_1} = \frac{1}{N}\sum_{k=1}^{N}\sum_{s=sensor1}^{sensor2}[q_{-,k,T_1}\times i_{-,(k-1),T_2} - i_{-,k,T_1}\times q_{-,(k-1),T_2}]_s \quad (28)$$

$$u_{+,T_2} = \frac{1}{N}\sum_{k=1}^{N}\sum_{s=sensor1}^{sensor2}[i_{+,k,T_2}\times i_{+,k,T_1} + q_{+,k,T_2}\times q_{+,k,T_1}]_s \quad (29)$$

$$v_{+,T_2} = \frac{1}{N}\sum_{k=1}^{N}\sum_{s=sensor1}^{sensor2}[q_{+,k,T_2}\times i_{+,k,T_2} - i_{+,k,T_2}\times q_{+,k,T_1}]_s \quad (30)$$

$$u_{-,T_2} = \frac{1}{N}\sum_{k=1}^{N}\sum_{s=sensor1}^{sensor2}[i_{-,k,T_2}\times i_{-,k,T_2} + q_{-,k,T_2}\times q_{-,k,T_1}]_s \quad (31)$$

$$v_{-,T_2} = \frac{1}{N}\sum_{k=1}^{N}\sum_{s=sensor1}^{sensor2}[q_{-,k,T_2}\times i_{-,k,T_1} - i_{-,k,T_2}\times q_{-,k,T_1}]_s \quad (32)$$

Because the time intervals T1 and T2 are interlaced, the velocity of motion should be essentially constant across the time intervals, so that the phase change across a T1 frame pair and the phase change across a T2 frame should be different (in fact, they should be in the ratio T1/T2). Due to the randomness of the speckle pattern, there is substantial variation in the computed value of any given b-vector relative to its theoretical value. However, as we did with multiple sensors, we can achieve an improved, higher-accuracy value of the phase change from multiple measurements by summing the b-vectors before calculating the phase change. We must, however, sum the b-vectors separately for T1 and T2 intervals. This summing of multiple b-vectors taken at different times to improve accuracy is another embodiment of this invention.

We then compute the average displacement ($\Delta\phi$), which is given by the angle of the b-vector. The average displacement ($\Delta\phi$) is computed along the '+' and the '−' direction separately for the $T_1$ and the $T_2$ frame pairs.

$$\Delta\phi_{+,T_1}=\text{ARCTAN}(u_{+,T_1},v_{+,T_1}) \quad (33)$$

$$\Delta\phi_{-,T_1}=\text{ARCTAN}(u_{-,T_1},v_{-,T_1}) \quad (34)$$

$$\Delta\phi_{+,T_2}=\text{ARCTAN}(u_{+,T_2},v_{+,T_2}) \quad (35)$$

$$\Delta\phi_{-,T_2}=\text{ARCTAN}(u_{-,T_2},v_{-,T_2}) \quad (36)$$

The technique of summing multiple b-vectors provides a much more accurate measurement of the phase change for the T1 and T2 intervals than any single measurement would, however, it does not (yet) distinguish the two cases shown in FIG. 11. We now address this. While measurement for a single time interval T1 could give an ambiguous result depending on the number of times the T1 phasor has wrapped around the origin, the T2 measurement will, in general, be different even if the T1 measurements are identical. The combination of the two measurements allows us to disambiguate the T1 measurements as follows.

We unwrap the displacement to reduce error.

$$\text{Unwrap error}=[(\Delta\phi_{+,T_1}+2\pi\times n_{+,T_1})\times T_2\div T_1]-\Delta\phi_{+,T_2}$$

Find a "$n_{+,T_1}$" in range of ($-n_{max}$,$n_{max}$) that has minimum unwrap error $$\Delta\phi_{+,T_1,unwrap}=\Delta\phi_{+,T_1}+2\pi\times n_{+,T_1}$$

$$n_{+,T_2}=\text{ROUND}\{[(\Delta\phi_{+,T_1,unwrap}\times T_2\div T_1)-\Delta\phi_{+,T_2}]\div 2\pi\}$$

$$\Delta\phi_{+,T_2,unwrap}=\Delta\phi_{+,T_2}+2\pi\times n_{+,T_2}$$

$$\text{Unwrap error}=[(\Delta\phi_{-,T_1}+2\pi\times n_{-,T_1})\times T_2\div T_1]-\Delta\phi_{-,T_2}$$

Find a "$n-,T_1$" in range of ($-n_{max}$,$n_{max}$) that has minimum unwrap error $$\Delta\phi_{-,T_1,unwrap}=\Delta\phi_{-,T_1}+2\pi\times n_{-,T_1}$$

$$n_{-,T_2}=\text{ROUND}\{[(\Delta\phi_{-,T_1,unwrap}\times T_2\div T_1)-\Delta\phi_{-,T_2}]\div 2\pi\}$$

$$\Delta\phi_{-,T_2,unwrap}=\Delta\phi_{-,T_2}+2\pi\times n_{-,T_2}$$

$$\Delta\phi_+ = N\times(\Delta\phi_{+,T_1,unwrap}+\Delta\phi_{+,T_2,unwrap}) \quad (37)$$

$$\Delta\phi_- = N\times(\Delta\phi_{-,T_1,unwrap}+\Delta\phi_{-,T_2,unwrap}) \quad (38)$$

$$\Delta x \alpha (\Delta\phi_+ - \Delta\phi_-) \quad (39)$$

$$\Delta y \alpha (-\Delta\phi_+ - \Delta\phi_-) \quad (40)$$

Move to next block of N-frame-pairs ($T_1/T_2$) from 2-sensors (reset all accumulators used in the block averaging).

With two different intervals, the phase difference between the two interval measurements differs depending on the number of times each phase is wrapped. However, we must choose an upper limit to the number of wraps that we will consider. We denote this limit by $n_{max}$. To optimally distinguish unwrapping up to $+/-n_{max}$, we choose $$T1=2n_{max}+1 \quad (41)$$

$$T2=2n_{max}+2 \quad (42)$$

While the algorithm described above applies to unwrapping motion in a single direction, it is also possible to perform a 2-dimensional unwrap, in which we iterate over the possible values of $n_1$ for both p and m axis. We then construct the error that is the sum of the errors for the two axes. This makes it possible to add an addition error term that, for example, penalizes solutions that give motion along an undesired axis. This has the effect that when there is noise in the system, unwrap errors can be biased toward giving motion along one axis (typically the x axis) and away from the another axis (typically the y axis), which reduces undesired off-axis jumps along high-speed motion along one particular axis. This technique, which we call "2-D unwrap" is most useful at high speed, and so would likely be used in high speed tracking modes.

Block Averaging

The above-discussed unwrap algorithm is very sensitive to errors in the T1/T2 delta-phases (due to noise). By summing the b-vectors (separately) for the T1 and T2 frame pairs within a block, we reduce the noise level sufficiently for the unwrap algorithm to pick the right value of the unwrap index 'n'.

Figure 13:
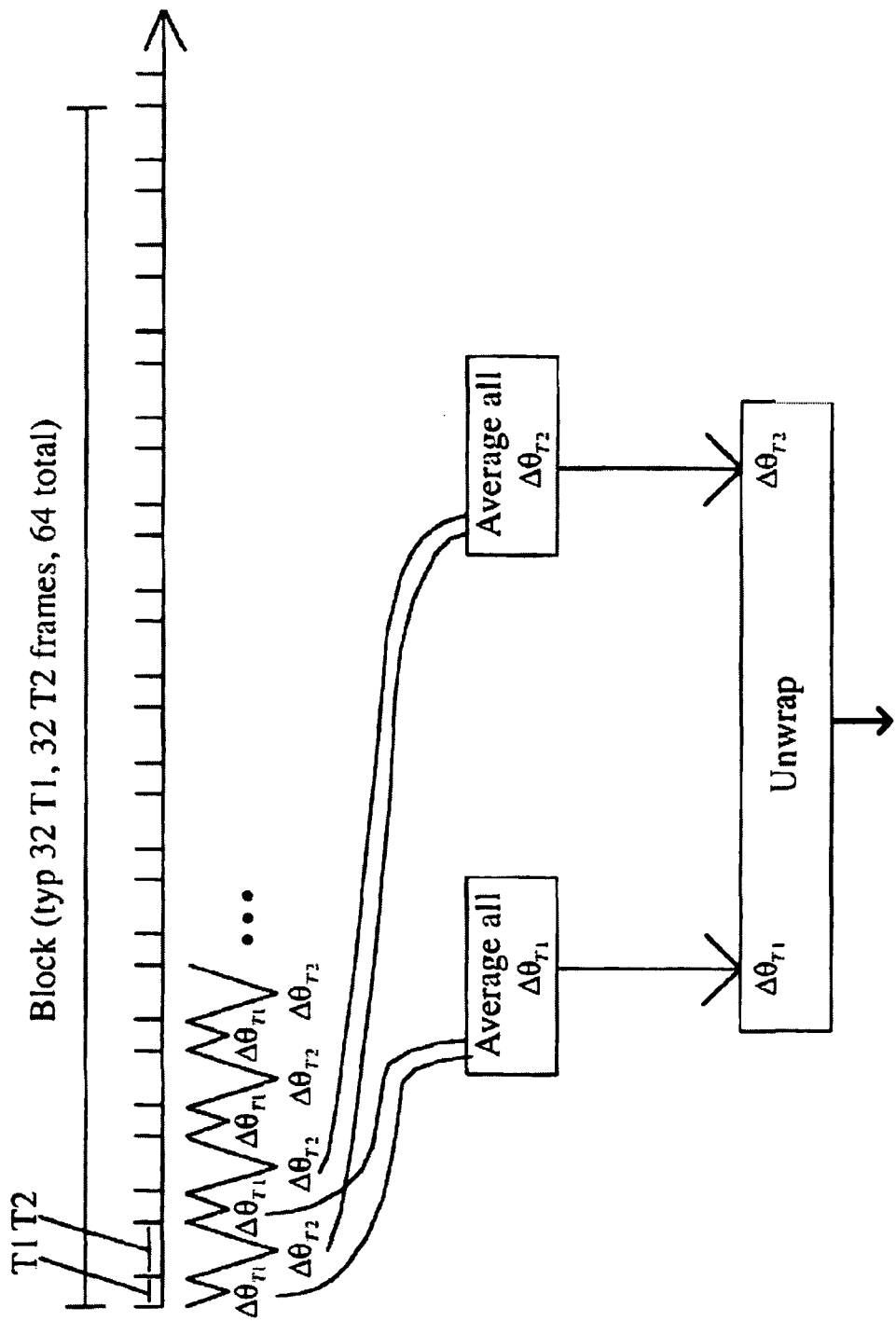
FIG. 13 is a schematic diagram showing block averaging in relation to phase unwrapping in accordance with an embodiment of the invention.

Thus, in contrast to the "trig-averaging" scheme described earlier in which all frames in a block are averaged (or summed) before b-vectors are computed, in this algorithm we compute b-vectors from consecutive pairs of frames and then average (sum) the resulting b-vectors over a block of frame pairs. FIG. 13 is a schematic diagram showing block averaging in relation to phase unwrapping in accordance with an embodiment of the invention. As shown in FIG. 13, delta-phases are computed for consecutive pairs of frames. The result is an average phase change per T1 interval and an average phase change per T2 interval. These averages may then be fed to the unwrap algorithm.

Magnitude-Averaging (Signal Strength) DSP Pipeline

A deficiency of prior signal processing algorithms is that in the presence of low signal, it is possible to compute a motion that is very large even though no motion has occurred. We now describe an embodiment of this invention that allows the elimination of this potential source of measurement error. FIG. 14 is a schematic diagram showing computation of a frame signal strength in accordance with an embodiment of the invention. As shown in FIG. 14, the frame signal strength is sum of squares of all the trig signals. The signal strength of an entire block of N frames is computed by summing each individual frame signal strength as shown in FIG. 15. We call this signal strength the block signal strength. While any given frame may have a large or small magnitude, if an entire block has a low signal strength, then the computed motion is likely to be erroneous and it is preferable to report no motion rather than the motion computed from either the TA or MS algorithms. These algorithms will typically report random drift even in the presence of no signal (due to mouse flip conditions, for example). The block signal strength may be used to decide blanking under such flip conditions. This prevents or reduces spurious reporting of motion under no signal conditions.

We note than many other measurements of signal strength may also be used beyond sum-of-squares of frame signals. Acceptable alternative measures could include sums of magnitudes, maximum or minimum magnitudes, or the same functions applied to b-vectors rather than frame signals.

Voting Feature

A deficiency of prior art signal processing is that even with schemes that include averaging and/or summing to reduce noise and errors, because speckle is random, there still remains a finite probability that any given measurement will return an erroneous value. If the rate of motion is slow and a single large error is returned, the user can perceive this erroneous report unfavorably as a "darting" motion. In another embodiment of this invention, such errors can be eliminated.

In the embodiment, groups of blocks (called "super-blocks") are considered. The computed displacements for three (or more) consecutive blocks may be computed, for example, by using the multiscale algorithm. If a minority of the block displacements deviate by more than a specified amount from a majority of the block displacements within the same superblock, then the minority values may be discarded in favor of a displacement more representative of the majority (for example, an average, or the most recently used majority value). This "voting" technique enables the avoidance of sporadic large errors.

CONCLUSION

As discussed above, an estimate of displacement of a speckle-based motion sensor may be determined using a technique which chooses between multiple parallel processing pipelines. In accordance with one embodiment of the invention, three parallel processing pipelines may be utilized, in particular, a trig-averaging pipeline for measuring slow motion, a multiscale-averaging pipeline for measuring fast motion, and a magnitude-averaging (signal strength) pipeline for detecting no motion under extremely weak or no signal condition.

One embodiment of the invention relates to a method of tracking motion using a speckle-based motion sensor. A distance moved is determined by a first signal processing procedure, and a distance moved is determined by a second signal processing procedure, wherein the first and second signal processing procedures are performed separately. Selection between said distances is made based on whether the distance determined by the first signal processing procedure exceeds a predetermined threshold distance.

According to a preferred embodiment, one of the two processing procedures makes a more accurate determination of distance for slower speeds, while the other signal processing procedure makes a more accurate determination of distance for higher speeds.

Another embodiment relates to an apparatus for tracking motion based on speckle patterns. The apparatus includes an array of detectors and various circuitry. The detectors in the array are connected in groups, each group producing a group signal, where the group signal represents a complex phase. It should be noted that there are many equivalent ways to represent such a complex phase as electrical signals, and while separate in-phase and quadrature signals are one such method, other representations are also possible. Circuitry is configured to sample each group signal at a sequence of discrete times to produce a sequence of sets of sampled group signals. Signal processing circuitry is configured to process the sets of sampled group signals to produce a sets of phase signals which are responsive to relative phases of the speckle patterns on the array of detectors, wherein the phase signals are quasi-periodic with distance moved. Additional signal processing circuitry is configured to calculate a change in phase from a first set of sampled group signals to a second set of sampled group signals so as to determine a displacement characterizing relative motion occurring between the first and second sets.

In a more specific embodiment, further signal processing circuitry is configured to average the first set of group signals to produce a first average group signal and to average the second set of group signals to produce a second average group signal. Further signal processing circuitry is configured to calculate a phase change between the first average group signal and the second average group signal.

Another embodiment relates to an optical sensor apparatus for tracking motion based on a speckle pattern. Signal processing circuitry is configured to determine a distance moved by a first signal processing procedure. Additional signal processing circuitry configured to determine a distance moved by a second signal processing procedure, wherein the first and second signal processing procedures are performed in parallel. Further signal processing circuitry is configured to select between said distances based on whether the distance determined by the first signal processing procedure exceeds a predetermined threshold distance.

Another embodiment relates to a method of tracking motion using a speckle-based motion sensor. A distance moved during three or more consecutive blocks is determined, wherein each block comprises some number N frames. A determination is further made as to whether the distance moved during one block of the consecutive blocks differs from the distance moved during a majority of the consecutive blocks by more than a predetermined threshold difference. Data for the one block is discarded if the predetermined threshold difference is surpassed.

The foregoing description of specific embodiments and examples of the invention have been presented for the purpose of illustration and description, and although the invention has been described and illustrated by certain of the preceding examples, it is not to be construed as being limited thereby. They are not intended to be exhaustive or to limit the invention to the precise forms disclosed, and many modifications, improvements and variations within the scope of the invention are possible in light of the above teaching. It is intended that the scope of the invention encompass the generic area as herein disclosed, and by the claims appended hereto and their equivalents.

What is claimed is:

1. A method of tracking motion relative to a surface using a speckle-based motion sensor, the method comprising:
    creating on the surface a plurality of speckle patterns based on movement of the surface along at least two nonparallel axes relative to a plurality of optical detectors;
    detecting said plurality of speckle patterns with said plurality of optical detectors;
    creating a set of electrical signals emitted from said optical detectors, such that said electrical signals based on the detected speckle patterns and vary quasi periodically with the distance moved along the at least two non-parallel axes;
    sampling said electrical signals at a plurality of discrete times extending over a time interval, creating a plurality of sampled electrical signals; and
    processing said plurality of sampled electrical signals to determine a distance moved during said time interval,
    wherein the creating a set of electrical signals includes creating one or more sets of phase signals based on the electrical signals, the phase signals responsive to relative phases of the speckle patterns, and the phase signals are quasi-periodic with the distance moved, and
    wherein said processing of said plurality of sampled electrical signals includes multiplying the values of signals from one time interval by the values of signals from an adjacent interval to form signal products, and adding or subtracting pairs of said signal products to form at least one b-vector.

2. The method of claim 1 wherein said processing of said plurality of sampled electrical signals includes dividing said time interval into subintervals and summing the values of said electrical signals within each of said subintervals.

3. The method of claim 1, wherein said processing of said plurality of sampled electrical signals includes:
    representing pairs of said electrical signals as a complex phasor and computing the phase of said phasor at each of said discrete times; and
    computing a distance moved from the differences in the values of said phases at two different discrete times.

4. The method of claim 1, wherein said processing of said plurality of sampled electrical signals includes:
    computing a b-vector for a first subset of said optical detectors; computing a b-vector for a second subset of said optical detectors; and summing said two b-vectors.

5. The method of claim 1, wherein said processing of said plurality of sampled electrical signals includes the step of computing a first b-vector at a first time and computing a second b-vector at a second time and summing said two b-vectors.

6. The method of claim 1, wherein said processing of said plurality of sampled electrical signals includes:
    computing a first b-vector from two sets of sampled electrical signals separated by a time interval T1; and
    computing a second b-vector from two sets of sampled electrical signals separated by a time interval T2, where T1 is not equal to T2.

7. The method of claim 1, wherein said processing of said plurality of sampled electrical signals includes:
    defining the signals from a first discrete time as a reference set of signals computing distance moved since said reference set of signals; and
    updating said reference set when said distance moved exceeds a predefined threshold.

8. The method of claim 1, wherein said processing of said plurality of sampled electrical signals includes:
    computing distance moved at a plurality of discrete times;
    replacing a value of said distance moved if the difference between the computed value of said distance moved differs from the values computed for other times within said plurality by more than a specified amount.

9. The method of claim 1, wherein said processing of said plurality of sampled electrical signals includes reporting no motion if the magnitude of one or more or a combination of said electrical signals falls below a predefined threshold.

10. The method of claim 8, wherein said processing of said plurality of sampled electrical signals includes:
    computing a plurality of b-vectors for a plurality of discrete times;
    summing said b-vectors to form a resultant b-vector; and
    reporting no motion if the magnitude of said resultant b-vector falls below a predefined threshold.

11. A method of tracking motion relative to a surface using a speckle-based motion sensor, the method comprising:
    creating on the surface a plurality of speckle patterns based on movement of the surface along at least two nonparallel axes relative to a plurality of optical detectors;
    detecting said plurality of speckle patterns with said plurality of optical detectors;
    creating a set of electrical signals emitted from said optical detectors, such that said electrical signals based on the detected speckle patterns and vary quasi periodically with the distance moved along the at least two non-parallel axes;
    sampling said electrical signals at a plurality of discrete times extending over a time interval, creating a plurality of sampled electrical signals; and
    processing said plurality of sampled electrical signals to determine a distance moved during said time interval,
    wherein said processing of said plurality of sampled electrical signals includes multiplying the values of signals from one time interval by the values of signals from an adjacent interval to form signal products, and adding or subtracting pairs of said signal products to form at least one b-vector.

12. The method of claim 11 wherein said processing of said plurality of sampled electrical signals includes dividing said time interval into subintervals and summing the values of said electrical signals within each of said subintervals.

13. The method of claim 11, wherein said processing of said plurality of sampled electrical signals includes:
    representing pairs of said electrical signals as a complex phasor and computing the phase of said phasor at each of said discrete times; and
    computing a distance moved from the differences in the values of said phases at two different discrete times.

14. The method of claim 11, wherein said processing of said plurality of sampled electrical signals includes:
    computing a b-vector for a first subset of said optical detectors; computing a b-vector for a second subset of said optical detectors; and summing said two b-vectors.

15. The method of claim 11, wherein said processing of said plurality of sampled electrical signals includes the step of computing a first b-vector at a first time and computing a second b-vector at a second time and summing said two b-vectors.

16. The method of claim 11, wherein said processing of said plurality of sampled electrical signals includes:
   computing a first b-vector from two sets of sampled electrical signals separated by a time interval T1; and
   computing a second b-vector from two sets of sampled electrical signals separated by a time interval T2, where T1 is not equal to T2.

17. The method of claim 11, wherein said processing of said plurality of sampled electrical signals includes:
   defining the signals from a first discrete time as a reference set of signals computing distance moved since said reference set of signals; and
   updating said reference set when said distance moved exceeds a predefined threshold.

18. The method of claim 11, wherein said processing of said plurality of sampled electrical signals includes:
   computing distance moved at a plurality of discrete times;
   replacing a value of said distance moved if the difference between the computed value of said distance moved differs from the values computed for other times within said plurality by more than a specified amount.

19. The method of claim 11, wherein said processing of said plurality of sampled electrical signals includes reporting no motion if the magnitude of one or more or a combination of said electrical signals falls below a predefined threshold.

20. The method of claim 19, wherein said processing of said plurality of sampled electrical signals includes:
   computing a plurality of b-vectors for a plurality of discrete times;
   summing said b-vectors to form a resultant b-vector; and
   reporting no motion if the magnitude of said resultant b-vector falls below a predefined threshold.

* * * * *